United States Patent [19]

Shimizu et al.

[11] Patent Number: 5,105,134
[45] Date of Patent: Apr. 14, 1992

[54] WIPER APPARATUS INTERLOCKING TO WASHER

[75] Inventors: Hiroyuki Shimizu; Sadayoshi Sugiyama; Hitoshi Sakuma; Fumio Nakajima, all of Yokohama, Japan

[73] Assignee: Jidosa Denki Kogyo K.K., Kanagawa, Japan

[21] Appl. No.: 655,589

[22] Filed: Feb. 15, 1991

[30] Foreign Application Priority Data

Feb. 16, 1990 [JP] Japan .................. 2-14513[U]

[51] Int. Cl.⁵ .......................... B60S 1/08; B60S 1/46
[52] U.S. Cl. .................... 318/445; 318/102; 318/446; 318/447; 318/DIG. 2
[58] Field of Search .......... 318/102, 443, 444, 445, 318/DIG. 2, 51, 53, 101, 446, 447, 484; 15/250 C, 250.12, 250.17

[56] References Cited

U.S. PATENT DOCUMENTS

| | | | |
|---|---|---|---|
| 3,582,732 | 6/1971 | Kovalsky | 318/102 |
| 3,691,442 | 9/1972 | Sheldrake | 318/443 |
| 3,716,766 | 2/1973 | Suzuki | 318/102 |
| 4,010,383 | 3/1977 | Grassmann | 318/483 |
| 4,916,373 | 4/1990 | Al-Attar et al. | 318/443 |

FOREIGN PATENT DOCUMENTS

| | | | |
|---|---|---|---|
| 2647519 | 4/1978 | Fed. Rep. of Germany | 15/250.12 |
| 2518471 | 6/1983 | France . | |
| 55-51643 | 4/1980 | Japan | 15/250.12 |
| 57-58536 | 4/1982 | Japan | 15/250.12 |
| 62-166143 | 7/1987 | Japan | 15/250.12 |

*Primary Examiner*—Bentsu Ro
*Attorney, Agent, or Firm*—Sughrue, Mion, Zinn, Macpeak & Seas

[57] ABSTRACT

A wiper apparatus comprises a wiper switch, a washer motor, a washer switch for actuating the washer motor by its on-operation, a wiper motor actuated independently by on-operation of the wiper switch and interlockingly with the washer motor by the on-operation of the washer switch, and a controller for maintaining the wiper motor to rotate until the load applied on the wiper motor reaches predetermined value. According to this invention, the wiper blade never stops before the cleaning liquid is removed from the wiping surface by detecting frictional resistance between the wiper blade and the wiping surface as the motor load.

1 Claim, 3 Drawing Sheets

WIPER APPARATUS INTERLOCKING TO WASHER

BACKGROUND OF THE INVENTION

1. Field of the Invention

This invention relates to a wiper apparatus used for wiping a wiping surface of, for example, a windshield of a motor vehicle with a wiper blade and, more particularly to the wiper apparatus which works interlockingly with operation of a washer to spray cleaning liquid against the wiping surface.

2. Description of the Prior Art

Heretofore, there has been used a wiper apparatus interlocking to a washer shown in FIG. 3, for example.

An illustrated wiper apparatus 100 is provided with a washer switch 101 for actuating a washer motor (not shown) and spraying cleaning liquid toward a wiping surface 50, and a relay 102, which is so structured as to be switched on interlockingly to on-operation of the washer switch 101 and switched off at the end of a time period set by timer (not shown) housed in a drive circuit 104 after the washer switch 101 is turned off.

A traveling contact 102a of the relay 102 is connected to an power terminal 103a provided to a wiper motor 103, and another power terminal 103b of the wiper motor 103 is connected to the drive circuit 104 provided with the timer.

An output shaft 103c of the wiper motor 103 is connected to a base end of a wiper arm 106 disposed rotatably on a vehicle body 60 through a wiper linkage 105.

A wiper blade 107 is fitted to a top end of the wiper arm 106, the wiper blade 107 is pushed against the wiping surface 50 by tensile force of a spring (not shown) housed in the wiper arm 106.

Upon rotating the output shaft 103c by actuating the wiper motor 103, the rotation of the output shaft 103c is converted into reciprocating motion of the wiper arm 106 through the wiper linkage 105, and the wiping surface 50 is wiped with the wiper blade 7 between both turning positions A and B.

On the other side, the wiper motor 103 is provided with an autostop switch 103d to stop the wiper blade 107 at a stop position (turning position B), and the autostop switch 103d is provided with an inner conductive plate 103e grounded and an outer conductive plate 103f, which are so constructed as to be rotatably linked with the output shaft 103c.

The autostop switch 103d is provided with an autostop contact 103g to come in or off contact with the inner conductive plate 103e and the outer conductive plate 103f, and another autostop contact 103h to come in or off contact with the outer conductive plate 103f, and the autostop contact 103g is connected with an off-contact 102b of the relay 102.

Another autostop contact 103h is connected to a power source, and an on-contact 102c of the relay 102 is grounded.

Spraying the cleaning liquid by turning the washer switch 101 on, the traveling contact 102a of the relay 102 is switched to the on-contact 102c from the off-contact 102b and comes in contact with the on-contact 102c, thereby the power terminal 103a of the wiper motor 103 is grounded and an electric current is supplied to the power terminal 103a from another power terminal 103b of the wiper motor 103 through the drive circuit 104.

The wiper motor 103 works and the wiping surface 50 is wiped with the wiper blade 107 between both turning positions A and B according to the rotation of the output shaft 103c of the wiper motor 103.

In this state, even if the spray of the cleaning liquid is stopped by switching off the washer switch 101, the wiper motor 103 does not stop immediately and continues to rotate as long as a predetermined time period by the function of the timer provided in the drive circuit 104. The traveling contact 102a of the relay 102 shifts to the off-contact 102b from the on-contact 102c when the predetermined time set by the timer elapses after the off-operation of the washer switch 101.

When the traveling contact 102a of the relay 102 comes in contact with the off-contact 102b, the wiper motor 103 continues to rotate for a while because the power terminal 103a of the wiper motor 103 is grounded through the autostop contact 103g and the inner conductive plate 103e if the wiper blade 107 is not in the turning position B. When the wiper blade 107 arrives at the turning position B by the rotation of the wiper motor 103, the autostop contact 103g of the autostop switch 103d separates from the inner conductive plate 103e and comes in contact with the outer conductive plate 103f. At the same time another autostop contact 103h comes also in contact with the outer conductive plate 103f.

Thereby, the power terminal 103a of the wiper motor 103 is connected to the power source through the outer conductive plate 103f, and the voltage applied to the power terminal 103a becomes equal to the voltage applied to another power terminal 103b of the wiper motor 103 so that the wiper motor 103 stops automatically with the wiper blade 107 remaining in the turning position B.

In addition to above, the wiper apparatus 100 is also provided with a wiper switch (not shown) for actuating the wiper motor 103 independently of the operation of the washer switch 101.

However, the aforementioned conventional wiper apparatus 100 is so structured that the wiper motor 103 continues to rotate merely for a time period set by the timer in the drive circuit 104 after the off-operation of the washer switch 101, and the time period set by the timer is constant. Therefore, the wiper blade 107 may stop wiping the wiping surface 50 in spite of the fact that the cleaning liquid is not yet wiped away from the wiping surface 50, and this is a problem since the cleaning liquid remaining on the wiping surface 50 obstructs the visual range of the driver in such a case.

SUMMARY OF THE INVENTION

Therefore, this invention is made in view of the aforementioned problem of the prior art and it is an object to provide a wiper apparatus interlocking to a washer which is capable of continuing wiping the wiping surface until the cleaning liquid is removed perfectly from the wiping surface and capable of keeping the visual range of the driver wide.

The construction of the wiper apparatus according to this invention in order to accomplish the above mentioned object is comprised of a wiper switch, a washer motor for spraying cleaning liquid toward a wiping surface, a washer switch for actuating the washer motor by its on-operation, a wiper motor actuated independently by on-operation of the wiper switch and interlockingly with the washer motor by the on-operation of the washer switch for driving a wiper blade on the wiping surface, and a control means for maintaining the rotation of the wiper motor until a load applied to the wiper motor reaches a predetermined value when the wiper motor is actuated interlockingly with the washer motor. The wiper apparatus according to a preferred aspect of this invention is characterized in that the above-mentioned control means is provided with a current detection means for detecting a load current flowing in the wiper motor, a determining means for determining whether or not current data output from the current detection means is larger than predetermined value, a memory means for storing determination data output from the determination means, a charging means for deciding a time interval of the wiper motor according to memorized data stored by the memory means, and a cancel means for cancelling the memorized data stored by said memory means.

In the wiper apparatus according to this invention, which is so structured as to interlock to the washer, the control means controls the wiper motor so as to continue rotating until the motor load reaches predetermined value when the wiper motor is actuated interlockingly to the washer motor.

Namely, when the cleaning liquid sprayed on the wiping surface remains thereon, frictional resistance between the wiping surface and the wiper blade becomes smaller and so the load applied to the wiper motor also reduces. Therefore, the control means makes the wiper motor continue to rotate so long as the motor load does not reach the predetermined value judging that the cleaning liquid has not yet been removed from the wiping surface.

The wiper apparatus according to a preferred aspect of this invention has the control means provided with the current detection means for detecting the load current flowing in the wiper motor, and is designed so as to sense the load applied to the wiper motor by detecting the load current flowing in the wiper motor and to determine whether or not the load current is larger than predetermined value by the determination means provided in the control means.

DESCRIPTION OF THE PREFERRED EMBODIMENT

Figure 1:
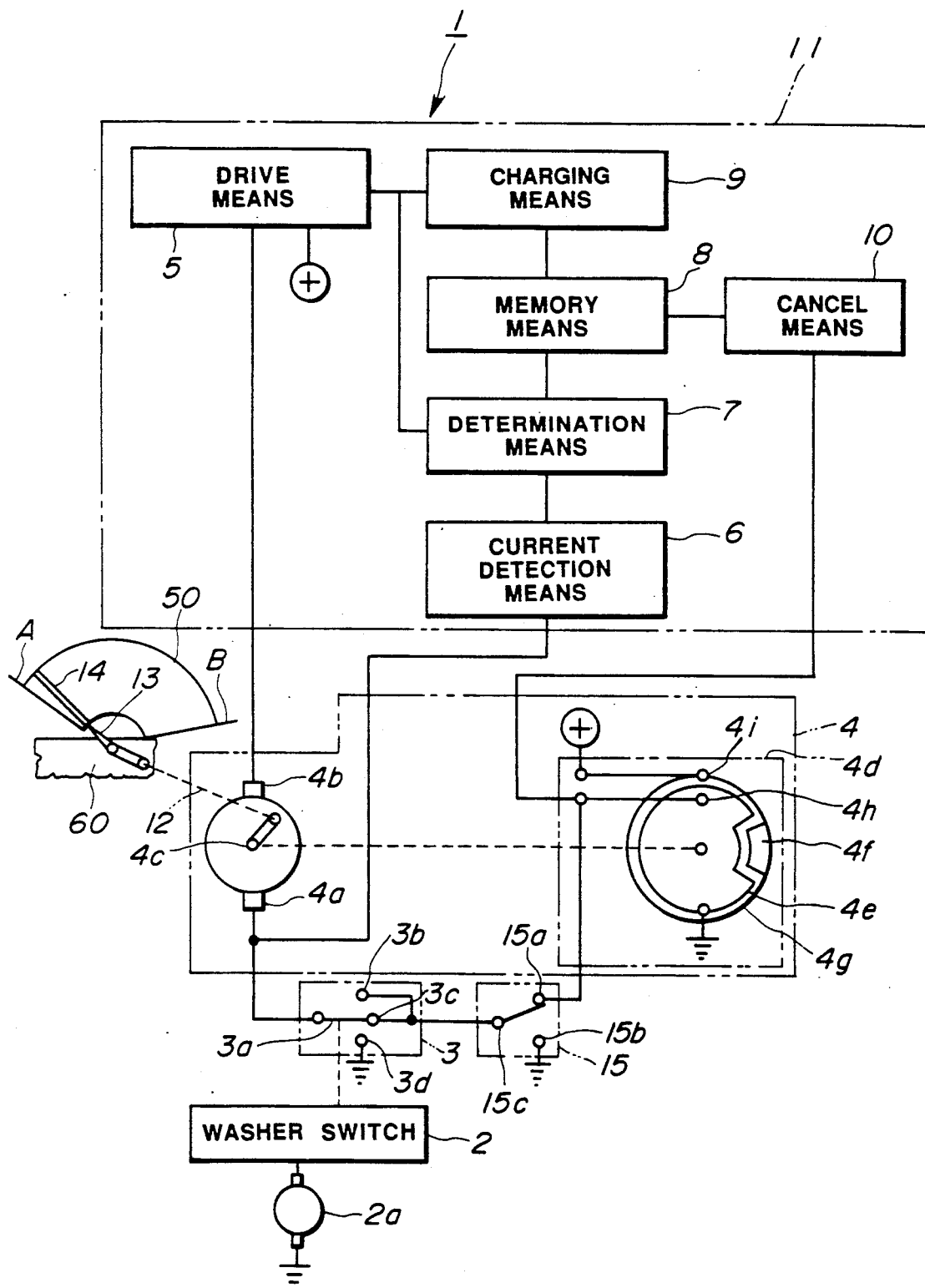
FIG. 1 is a functional block diagram illustrating the wiper apparatus according to an embodiment of this invention.
Figure 2:
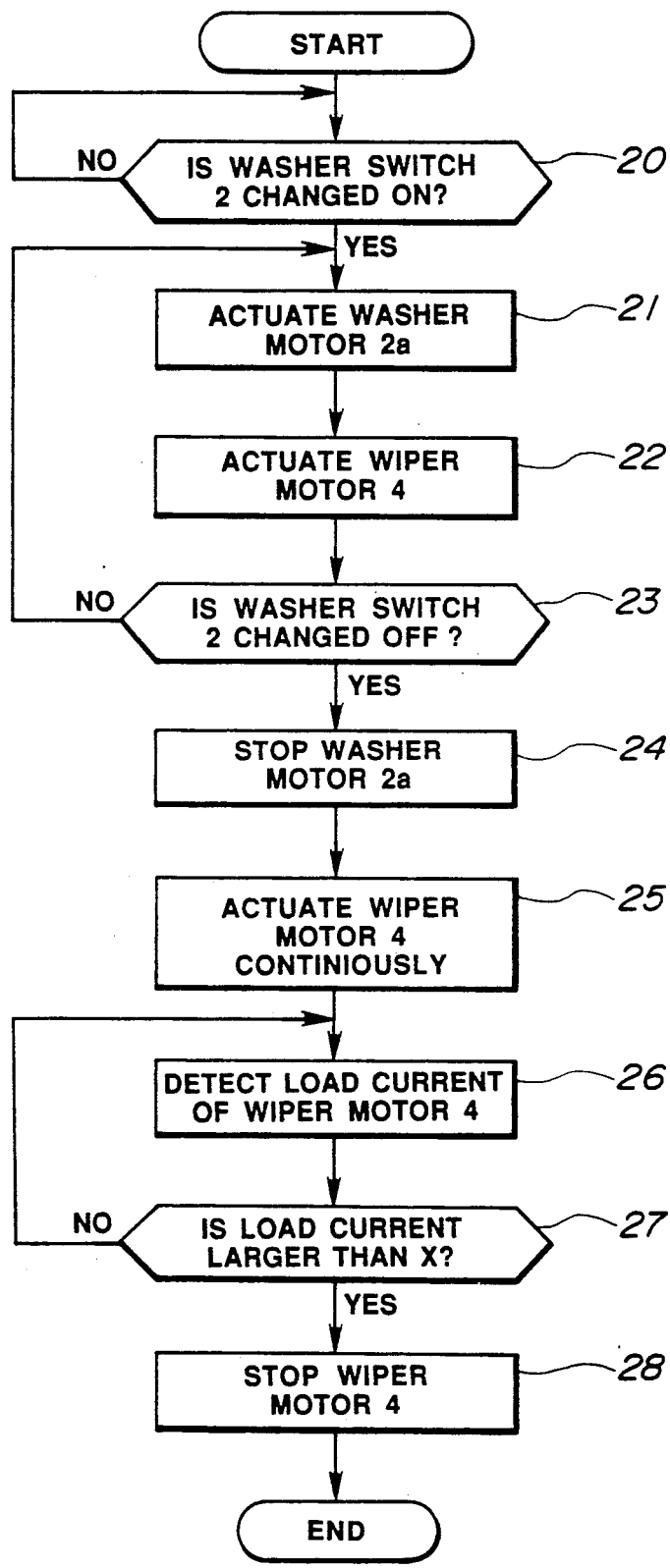
FIG. 2 is a flow chart explaining the control of the wiper apparatus shown in FIG. 1.
Figure 3:
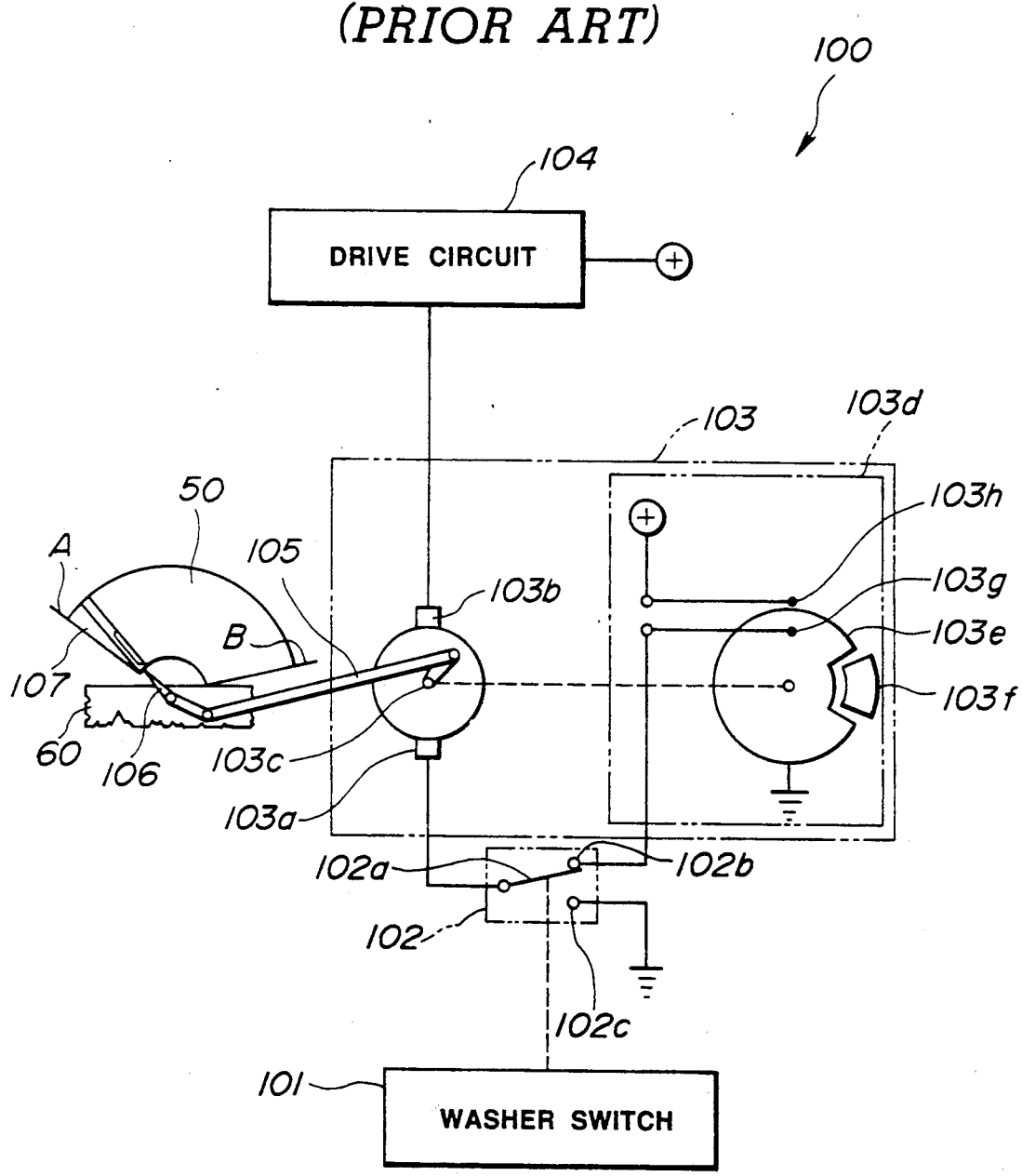
FIG. 3 is a block diagram illustrating the conventional wiper apparatus interlocking to the washer.

An embodiment of the wiper motor according to this invention will be described below on basis of FIG. 1 and FIG. 2.

An illustrated wiper apparatus 1 is provided with a washer switch 2 for spraying cleaning liquid toward a wiping surface 50 by actuating a washer motor 2a and a wiper switch 3 for driving a wiper blade 14 (will be described later) by actuating a wiper motor 4. The wiper switch 3 is changeable interlockingly according to the switching operation of the washer switch 2 and capable of actuating or deactuating the wiper motor 4 by its on-operation or off-operation independently of the switching operation of the washer switch 2.

A movable contact 3a of the wiper switch 3 is connected to a power terminal 4a provided on the wiper motor 4, and another power terminal 4b provided on the wiper motor 4 is connected to a drive means 5 of a control means 11, which is provided with a current detection means 6, a determination means 7, a memory means 8, a charging means 9 and a cancel means 10 as well as the drive means 5.

An output shaft 4c of the wiper motor 4 is connected to a base end of a wiper arm 13 disposed rotatably on a vehicle body 60 through a wiper linkage 12.

The wiper blade 14 is fitted to a top end of the wiper arm 13, the wiper blade 14 is pushed against the wiping surface 50 by tensile force of a spring (not shown) housed in the wiper arm 13.

Upon rotating the output shaft 4c by actuating the wiper motor 4, the rotation of the output shaft 4c is converted into reciprocating motion of the wiper arm 13 through the wiper linkage 12, and the wiping surface 50 is wiped with the wiper blade 14 between both turning positions A and B.

On the one side, the wiper motor 4 is provided with an autostop switch 4d to stop the wiper blade 14 at a stop position that is the turning position B regardless of the position of the wiper blade 14 at the time of changing the wiper switch 3 off. The autostop switch 4d is provided with an inner conductive plate 4e grounded and an outer conductive plate 4f on a link member 4g which is structured so as to be rotatably linked with the output shaft 4e of the wiper motor 4.

The autostop switch 4d is provided with an autostop contact 4h to come in or off contact with the inner conductive plate 4e and the outer conductive plate 4f and another autostop contact 4i to come in or off contact with the outer conductive plate 4f, and the autostop contact 4h is connected to the cancel means 10 of the control means 11 and another contact 4i is connected to a power source.

The autostop contact 4h is also connected to a fixed contact 15a (normally closed side) of a relay 15 and another fixed contact 15b (normally opened side) is grounded.

Furthermore, the wiper switch 3 is provided with an off-contact 3b, an intermittent-contact 3c and a low-contact 3d, and the off-contact 3b and the intermittent-contact 3c are connected to a traveling contact 15c of the relay 15. The low-contact 3d is grounded.

The wiper motor 4 is so designed as to be actuated or deactuated independently according to the on or off-operation of the wiper switch 3 because the traveling contact 15c of the relay 15 remains being in contact with the fixed contact 15a (normally closed side) in the case the wiper switch 3 is solely operated.

The relay 15 works according to the off-operation of the washer switch 2 so as to contact the traveling contact 15c with the fixed contact 15b (normally opened side), and makes the wiper motor 4 continue to rotate through the drive means 5 in spite of turning off the wiper switch 3 interlockingly to the off-operation of the washer switch 2. A load current flowing in the wiper motor 4 is detected at this time.

On the other side, the drive means 5 in the control means 11 is connected to the power source, and the current detection means 6 in the control means 11 is also connected to the power terminal 4a of the wiper motor 4.

The current detection means 6 which is so designed as to receive a load current of the wiper motor 4, detects the load current proportional to the motor load, and outputs the load current as current data. The current detection means 6 works at the same time the washer switch 2 is changed off and the traveling contact 15c of the relay 15 comes in contact with the fixed contact 15b.

The determination means 7 is so designed as to receive the current data from the current detection means 6, and determines whether the current data is larger than the predetermined current value (X) or not, and outputs the current data as determined data.

The memory means 8 is so designed as to receive the determination data from the determination means 7, stores and outputs the determined data as memorized data.

The charging means 9 is so designed as to receive the memorized data from the memory 8 if the current data is not larger than the predetermined current value.

When the current data output from the current detection means 6 is larger than the predetermined current value, the memorized data is not input to the changing means 9, the wiper motor 4 stops by returning the traveling contact 15c of the relay 15 to the fixed contact 15a at the state in which the wiper blade 14 is in the turning position B by the function of the autostop switch 4d.

The cancel means 10 is so designed as to be grounded by the inner conductive plate 4e through the autostop contact 4b of the autostop switch 4d, the memorized data stored in the memory means 8 is cancelled by contacting the autostop contact 4h with the inner conductive plate 4e.

Next, explanation will be given about the control of the wiper apparatus 1 on basis of the flow chart shown in FIG. 2.

Starting the program according to on-operation of an ignition switch (not shown), determination is done as to whether the washer switch 2 is changed on or not at step 20.

In step 20, when the washer switch 2 is changed on (YES), control proceeds to next step 21, and if the washer switch 2 is not changed on (NO) at step 20, the determination is repeated at step 20 until the washer switch 2 is changed on (waiting).

In step 21 to which the control proceeds in the case the washer switch 2 is changed on, the washer motor 2 is actuated and control proceeds to step 22.

The wiper motor 4 is actuated at step 22.

The cleaning liquid is sprayed toward the wiping surface 50 by actuating the washer motor 2a according to the on-operation of the washer switch 2, and the wiper motor 4 is actuated by the contact of the movable contact 3a with the intermittent contact 3c according to the on-operation of the wiper switch 3 interlocking to the washer switch 2, so that the wiping surface 50 is wiped with the wiper blade 14.

In step 22, the wiper motor 4 is actuated and control proceeds to step 23.

In step 23, determination is done as to whether the washer switch 2 is changed off or not.

In step 23, when the washer switch 2 is changed off (YES), control proceeds to next step 24, and if the washer switch 2 is not changed off (NO) at step 23, control proceeds previous step 21.

In step 24 to which the control proceeds when the washer switch 2 is changed off (in this time, the wiper switch 3 is also changed off interlockingly to the off-operation of the washer switch 2), the washer motor 2a is stopped and control proceeds to step 25.

In step 25, the wiper motor 4 is actuated continuously nevertheless the wiper switch 3 is changed off by contacting the traveling contact 15c of the relay 15 with the fixed contact 15b (normally opened side) and control proceeds to step 26.

In step 26, the load current flowing in the wiper motor 4 is detected by the current detection means 6 and control proceeds to step 27.

In step 27, determination is done by the determination means 7 as to whether the load current (current data) of the wiper motor 4 is larger than the predetermined current value (X) or not.

In step 27, when the load current is larger than the predetermined current value (YES), control proceeds to step 28, and if the load current is not larger than the predetermined current value (NO) at step 27, control proceeds to previous step 26.

In step 28 to which the control proceeds from step 27 when the load current is larger than the predetermined current value, the wiper motor 4 is stopped through the autostop switch 4d by returning the relay 15 so as to contact the traveling contact 15c with fixed contact 15a (normally closed side). If the determination is done that the load current is not larger than the predetermined current value at step 27, the wiper motor 4 continues to rotate by keeping the relay 15 so as to contact the traveling contact 15c with the fixed contact 15b (normally open side) and supplying the electric current to the wiper motor 4 from the drive means 5 through the memory means 8, and the processes of steps 26 and 27 are repeated.

In this time, the memorized data stored in the memory means 8 is cleared by the cancel means 10 every time the autostop contact 4h of the autostop switch 4d comes in contact with the inner conductive plate 4e.

As mentioned above, the wiper apparatus according to this invention comprises a wiper switch, a washer motor for spraying cleaning liquid toward a wiping surface, a washer switch for actuating the washer motor by its on-operation, a wiper motor actuated independently by on-operation of the wiper switch and interlockingly with the washer motor by the on-operation of the washer switch for driving a wiper blade on the wiping surface, and a control means for maintaining the wiper motor to rotate until a load applied to the wiper motor reaches a predetermined valve when the wiper motor is actuated interlockingly with the washer motor. Therefore, an excellent effect can be obtained in that it is possible to keep the visual range of the driver widely because the wiper blade continues to wipe the wiping surface so long as the cleaning liquid remains on the wiping surface by detecting the load applied on the wiper motor.

What is claimed is:

1. A wiper apparatus comprising:

a wiper switch;

a washer motor for spraying cleaning liquid toward a wiping surface;

a washer switch for actuating said washer motor by its on-operation;

a wiper motor actuated independently by on-operation of said wiper switch and interlockingly with washer motor by the on-operation of said washer switch for driving a wiper blade on the wiper surface; and a control means for maintaining the rotation of the wiper motor until a load applied to said wiper motor reaches a predetermined value when the wiper motor is actuated interlockingly with the washer motor;

a current detection means for detecting a load current flowing in the wiper motor;

a determination means for determining whether or not current data output from said current detection means is larger than said predetermined value;

a memory means for storing the determination data output from said determination means;

a charging means for deciding a time interval of the wiper motor according to the determination data stored by said memory means; and a cancel means for cancelling the determination data stored by said memory means.

* * * * *